US011727265B2

(12) United States Patent
Alvarez et al.

(10) Patent No.: US 11,727,265 B2
(45) Date of Patent: Aug. 15, 2023

(54) METHODS AND APPARATUS TO PROVIDE MACHINE PROGRAMMED CREATIVE SUPPORT TO A USER

(71) Applicant: Intel Corporation, Santa Clara, CA (US)

(72) Inventors: Ignacio Javier Alvarez, Portland, OR (US); Javier Felip Leon, Hillsboro, OR (US); David Israel Gonzalez Aguirre, Hillsboro, OR (US); Javier Sebastian Turek, Beaverton, OR (US); Luis Carlos Maria Remis, Hillsboro, OR (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 16/455,346

(22) Filed: Jun. 27, 2019

(65) Prior Publication Data

US 2019/0318244 A1    Oct. 17, 2019

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
USPC ........... 706/20; 726/2, 21, 36; 713/150, 163, 713/181; 380/255, 264, 276
See application file for complete search history.

(56) References Cited

U.S. PATENT DOCUMENTS

| 7,587,598 B2 * | 9/2009 | Ohba | H04L 63/08 713/169 |
| 7,917,758 B2 * | 3/2011 | Palekar | H04L 63/08 709/227 |
| 8,843,738 B2 * | 9/2014 | Vos | H04L 69/22 709/224 |

(Continued)

OTHER PUBLICATIONS

Roberts, Adam et al., "Magenta.js: A JavaScript API for Augmenting Creativity with Deep Learning", proceedings of the 35th International Conference on Machine Learning, Stockholm, Sweden, PMLR 80, 2018, 3 pages.

(Continued)

*Primary Examiner* — Sharif E Ullah
(74) *Attorney, Agent, or Firm* — Hanley, Flight & Zimmerman, LLC

(57) ABSTRACT

Methods, apparatus, systems and articles of manufacture to provide machine programmed creative support to a user are disclosed. An example apparatus include an artificial intelligence architecture to be trained based on previous inputs of the user; a processor to: implement a first machine learning model based on the trained artificial intelligence architecture; and predict a first action based on a current state of a computer program using the first machine learning model; implement a second machine learning model based on the trained artificial intelligence architecture; and predict a second action based on the current state of the computer program using the second machine learning model; and a controller to select a state based on the action that results in a state that is more divergent from the current state of the computer program.

24 Claims, 7 Drawing Sheets

(56) References Cited

U.S. PATENT DOCUMENTS

| | | | | |
|---|---|---|---|---|
| 9,026,784 | B2* | 5/2015 | Buruganahalli | H04L 63/20 |
| | | | | 713/176 |
| 9,608,963 | B2* | 3/2017 | Lu | H04L 67/14 |
| 10,009,183 | B2* | 6/2018 | Pahl | G06F 21/33 |
| 10,438,111 | B2* | 10/2019 | Iscoe | G06F 16/2379 |
| 10,670,890 | B2* | 6/2020 | Graff | H04R 1/1008 |
| 2008/0098207 | A1* | 4/2008 | Reid | G06F 11/362 |
| | | | | 714/E11.207 |
| 2015/0128058 | A1* | 5/2015 | Anajwala | H04L 67/025 |
| | | | | 715/739 |
| 2015/0186712 | A1* | 7/2015 | Movellan | G06V 10/993 |
| | | | | 382/159 |
| 2017/0268001 | A1* | 9/2017 | Khodarev | A61K 31/713 |
| 2018/0247195 | A1* | 8/2018 | Kumar | G16B 40/10 |
| 2018/0268222 | A1* | 9/2018 | Sohn | G06V 40/172 |
| 2018/0307188 | A1* | 10/2018 | Mummadi | G06F 17/18 |
| 2018/0308012 | A1* | 10/2018 | Mummadi | G06N 3/08 |
| 2018/0349324 | A1* | 12/2018 | Krappé | G06Q 30/0283 |
| 2018/0357552 | A1* | 12/2018 | Campos | G06N 3/08 |
| 2019/0260782 | A1* | 8/2019 | Humphrey | H04L 63/0209 |
| 2019/0318244 | A1* | 10/2019 | Alvarez | G06N 3/047 |
| 2019/0370440 | A1* | 12/2019 | Gu | G06N 3/048 |
| 2019/0370615 | A1* | 12/2019 | Murphy | G06F 9/541 |
| 2020/0097853 | A1* | 3/2020 | Golovin | G06N 5/01 |
| 2020/0111018 | A1* | 4/2020 | Golovin | G06F 17/11 |
| 2020/0167691 | A1* | 5/2020 | Golovin | G06N 20/00 |
| 2020/0242250 | A1* | 7/2020 | Chen | G06V 10/82 |
| 2021/0304009 | A1* | 9/2021 | Bazarsky | G06N 3/06 |
| 2022/0004818 | A1* | 1/2022 | Koopman | G06N 3/084 |
| 2022/0012572 | A1* | 1/2022 | Chen | G06N 3/045 |
| 2022/0043978 | A1* | 2/2022 | Wang | G06F 40/289 |
| 2022/0044283 | A1* | 2/2022 | Briancon | G06N 3/006 |
| 2022/0046057 | A1* | 2/2022 | Kutt | H04L 63/145 |
| 2022/0067420 | A1* | 3/2022 | Alatwah | G06F 18/40 |
| 2022/0126878 | A1* | 4/2022 | Moustafa | B60W 50/0098 |

OTHER PUBLICATIONS

Uchida, Yusuke et al., "Embedding Watermarks into Deep Neural Networks", proceedings of the 2017 ACM on International Conference on Multimedia Retrieval, Bucharest, Romania, pp. 269-277, Jun. 6-9, 2017, 11 pages.

Murali, Vijayaraghavan et al., "Neural Sketch Learning for Conditional Program Generation", published as a conference paper at ICLR 2018, Mar. 16, 2017, 18 pages.

Ha, David et al., "A Neural Representation of Sketch Drawings", Apr. 11, 2017, 16 pages.

Roberts, Adam et al., "A Hierarchical Latent Vector Model for Learning Long-Term Structure in Music", proceedings of the 35th International Conference on Machine Learning, Stockholm, Sweden, Jul. 30, 2018, 16 pages.

Mikolov, Tomas et al., "Distributed Representations of Words and Phrases and their Compositionality", Proceedings of the 26th International Conference on Neural Information Processing Systems—vol. 2, pp. 3111-3119, Dec. 5-10, 2013, 10 pages.

Pu, Yunchen et al., "Variational Autoencoder for Deep Learning of Images, Labels and Captions", 30th Conference on Neural Information Processing Systems, Barcelona, Spain, Sep. 28, 2016, 10 pages.

Mnih, Volodymyr et al., "Asynchronous Methods for Deep Reinforcement Learning", Proceedings of the 33rd International Conference on Machine Learning, New York, NY, Feb. 4, 2016, 11 pages.

Sachdev, Saksham et al., "Retrieval on Source Code: A Neural Code Search", Proceedings of 2nd ACM SIGPLAN International Workshop on Machine Learning and Programming Languages, pp. 31-41, Jun. 18, 2018, 12 pages.

Solar-Lezama, Armando et al., "Combinatorial Sketching for Finite Programs", Proceedings of the 12th International Conference on Architectural Support for Programming Languages and Operating Systems, pp. 404-415, Oct. 21-25, 2006, 14 pages.

Gottschlich et al., "The Three Pillars of Machine Programming," Intel Labs, MIT, arXiv:1803.07244v2, May 8, 2018, 11 pages.

* cited by examiner

METHODS AND APPARATUS TO PROVIDE MACHINE PROGRAMMED CREATIVE SUPPORT TO A USER

FIELD OF THE DISCLOSURE

This disclosure relates generally to machine learning, and, more particularly, to methods and apparatus to provide machine programmed creative support to a user.

BACKGROUND

In recent years, machine learning and/or artificial intelligence have increased in popularity. For example, machine learning and/or artificial intelligence may be implemented using neural networks. Neural networks are computing systems inspired by the neural networks of human brains. A neural network can receive an input and generate an output. The neural network can be trained (e.g., can learn) based on feedback so that the output corresponds a desired result. Once trained, the neural network can make decisions to generate an output based on any input. Neural networks are used for the emerging fields of artificial intelligence and/or machine learning.

Figure 1:
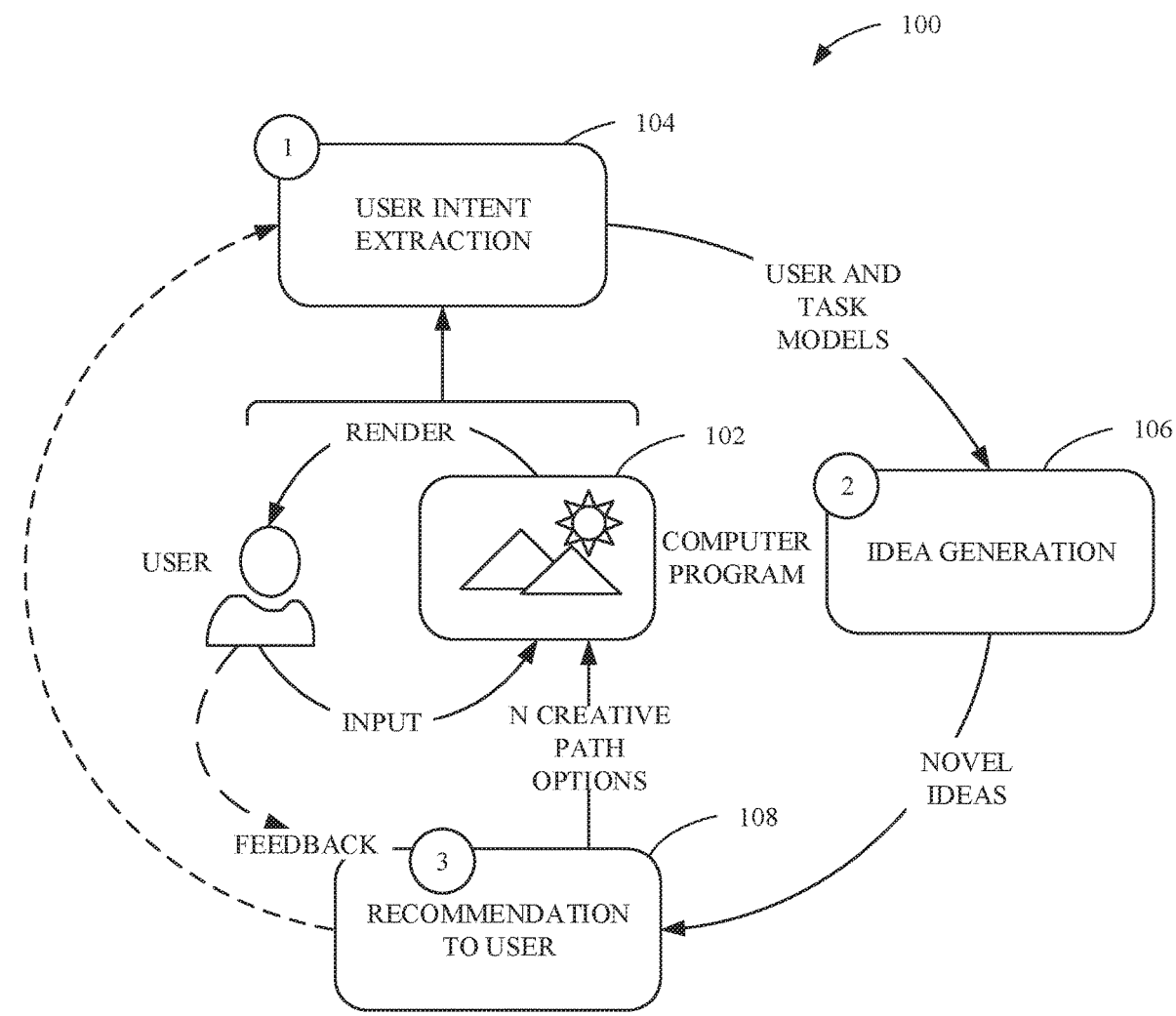
FIG. 1 is a schematic illustration of an example machine programmed creative support process.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Automation has increased the productivity of human labor taking over repetitive tasks and performing semi-supervised operations at large scale. The advent of unsupervised learning is executed with automated systems that can learn on their own, given interactions with the environment, through optimization towards a predefined reward function. Artificial neural networks may be applied to a variety of problems, from pattern recognition to prediction engines, recommendation systems and data-based analytics empower professionals in science and engineering.

Creative processes (e.g., writing code, drawing, writing text, writing music, dancing, creating video, video editing, etc.) traditionally requires an intelligent actor (e.g., a human) to invest mental resources to generate these novel ideas. Every programmer/writer/painter/musician/artist reaches at a certain point where a creative roadblock (e.g., writer's block) prevent continuous creative output. In some examples, a creative block is a build-up of trial and error repetitions. Mental blocks cause delay in the generation of new and creative items.

Examples disclosed herein provide machine programming support to creators using a computer system in the task of finding inspiration to break out of a creative block. Examples disclosed herein apply a continuous vector representation to capture the latent creative intent and match it with the task at hand (e.g., code composability, sketch generation, poem composition, music composition, choreography, video editing and/or directing, finding ingredients and cooking procedures, etc.). Examples disclosed herein apply a semi-supervised method in the exploration space, guided by the system's understanding of the user bias. Rather than a random exploration process, the idea generation is curated based on a learned user model so that the proposed solution(s) fit their subjective bias. The final recommendations are selected from divergent solutions that have undergone several iterations and are presented back to the user for stimulation of his/her creative process.

When a human experiences a creative block stopping the creative process (e.g., based on no further interactions with the computer system), examples disclosed herein initiate a machine-based creative idea or "machine muse" task by retrieving the trial-and-error phases and initiating an automatic exploration of the design space using one or more neural networks whose function is to come up with novel ideas to present to the user when the user returns does not interact with a computing program for a threshold duration of time and/or based on explicit instructions from the user. Artificial intelligence (AI), including machine learning (ML), deep learning (DL), and/or other artificial machine-driven logic, enables machines (e.g., computers, logic circuits, etc.) to use a model to process input data (e.g., corresponding to the current state of the computer system) to generate an output based on patterns and/or associations previously learned by the model based on the user's historical interactions with the computer device during a training process. For example, one or more neural networks may be trained with data to recognize patterns and/or associations and follow such patterns and/or associations when processing input data such that other input(s) in output(s) consistent with the recognized patterns and/or associations. Although the use of one or more neural networks is described herein, any suitable machine learning architecture (e.g., deep learning, natural language processing, expert systems, machine learning models and/or algorithms, etc.) may additionally or alternatively be used. In this manner, the trained neural networks can predict a user's next action with respect to a computer program based on the current state of a computer program (e.g., including the last user input(s)).

Once the one or more neural networks have been trained to predict the next action that a user may take based on the current state of a computer program, examples disclosed herein deploy the trained one or more neural networks to multiple computer cores as part of an idea generation process. In the idea generation process, the current state of the computer program is input to the one or more neural networks of the X computer cores to generate X predictions of the next action of the user. Examples disclosed herein select one or more of the X predictions that, when applied to the current state, are most different from the current state (e.g., based on a Euclidean distance) to use as inspirations for the user. The most different (e.g., divergent) predictions correspond to the most creative results that are based on the user's historical inputs. Accordingly, the more divergent predictions are used to spark inspiration in the user to overcome the creative block. In some examples disclosed herein, the most divergent result(s) are plugged back into the trained neural networks of the computer cores to generate even more creative solutions as part of an iterative process. In some examples, user feedback corresponding to the generated inspirations may be used to further train the neural networks on an ongoing basis.

Many different types of machine learning models and/or machine learning architectures exist. In examples disclosed herein, an actor-critic model with a variational encoder is used. Using an actor critic model with a variational encoder enables a neural network to predict user actions based on the current state of a computer program and the previous user inputs. In general, machine learning models/architectures that are suitable to use in the example approaches disclosed herein will be any type of machine learning model/architecture, any type of artificial intelligence, and/or any type of neural networks (e.g., variational encoders, convolution neural networks, deep neural network, replacement neural network, etc.).

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using user inputs and the state of a computer program. However, any other training algorithm may additionally or alternatively be used. In examples disclosed herein, training is performed until a threshold number of actions have been predicted. In examples disclosed herein, training is performed either locally (e.g. in the device) remotely (e.g., in the cloud and/or at a server). Training is performed using hyperparameters that control how the learning is performed (e.g., a learning rate, a number of layers to be used in the machine learning model, etc.). In some examples re-training may be performed. Such re-training may be performed in response to a new program being implemented or a new user using the device.

Training is performed using training data. In examples disclosed herein, the training data originates from user inputs and the state of a computer program. Because supervised training may be used, the training data is labeled. In sonic examples, the training data is pre-processed, for example, to encode inputs from a user and/or the state of a computer program.

Once training is complete, the model is deployed for use as an executable construct that processes an input and provides an output based on the network of nodes and connections defined in the model. The model is stored locally in memory (e.g., cache and moved into memory after trained) or may be stored in the cloud. The model may then be executed by the computer cores.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a schematic illustration of an example machine programmed creative support architecture 100. FIG. 1 includes an example computer program 102 that is being used by a user 103, an example user intent extraction element 104, an example idea generation element 106, and an example recommendation to user element 108.

In the example machine programmed creative support architecture 100 of FIG. 1, the user 103 interacts with the example computer program 102 to create an output. For example, the computer program 102 may be a computer program that allows the user 103 to create text (e.g., to write a paper, book, script, computer program, and/or any type of text), create an image, a video, an animation, audio, etc. The computer program 102 allows the user 103 to enter an input (e.g., by interacting with a user interface, such as a keyboard, an electronic instrument, a mouse, a sensor, a touchscreen, a stylus, etc.) and renders the output to the user 103 via a media output device (e.g., a display, a speaker, etc.). In this manner, as the user 103 enters inputs, the computer program 102 renders the inputs to generate an output for the user 103. For example, when the user 103 swipes a finger on a touchscreen of a device running a computer program associated with painting, the computer program 102 may render the swipe as a paint stroke on the touchscreen of the device. In another example, when the user 103 types a character or string onto a computer while the computer program 102 running on the computer program is a word processor, the computer program 102 renders the text by displaying the text entered by the user 103 on a screen.

While the user 103 is providing inputs to the computer program 102 of FIG. 1, the example user intent extraction element 104 extracts the user inputs to attempt to determine the intent of the user 103. For example, the user intent extraction element 104 includes training one or more neural networks (and/or other machine learning structure) to extract the user's intent by predicting, after each input of the user, the next input and generating a reward for the predicted input based on whether the prediction was successful or not (e.g., whether the user's subsequent input matched the predicted input). Once sufficiently trained (e.g., after a threshold number of predictions, after the prediction success rate is above a threshold, etc.), the one or more trained neural networks will be able to predict the users next action based on the current state of the computer program 102 and/or the last action taken by the user 103 with some amount of accuracy. The trained one or more neural networks may be used to generate ideas for the user 103 in connection with the idea generation element 106.

The example idea generation element 106 of FIG. 1 corresponds to generating an idea (e.g., a muse) to inspire the user 103 based on a trigger (e.g., when the user 103 has not provided an input within a threshold amount of time or when the user 103 requests an inspiration). For example, the current state of the computer program 102 (e.g., which may include the last user input) is used as an input to multiple copies of the trained one or more neural networks to generate an output corresponding to a predicted output of the user 103 based on the user's historical creation patterns (e.g., previous inputs). Although the multiple copies of the trained one or more neural networks receive the same input, the output of the neural networks may be different. Because the idea creation is used to combat "writer's block" or another creative block of the user 103, the idea generation element 106 may discard the outputs that are most similar to the current state of the computer program 102 and maintains outputs that is/are most divergent from the current state of the computer program 102. In this manner, the remaining output(s) represent the most creative (e.g., based on being divergent) predictions based on the user's historical interaction with the computer program 102. The most creative predictions are more likely to inspire the user 103 because the user 103 is usually stuck due to a lack of creativity. In some examples, the idea generation element 106 may correspond to an iterative process where the X most divergent outputs are used as inputs for the different copies of the one or more trained neural networks for one or more subsequent iterations.

Once the example idea generation 106 generates one or more creative ideas for the user 103, the example recommendation to user element 108 provides one or more creative recommendations to the example computer program 102 so that the computer program 102 can render the creative recommendations to the user 103. In some examples, the recommendation to user element 108 corresponds to receiving feedback from the user 103. The feedback may correspond to whether the user 103 used none, part, or all of the recommendation(s), whether the user 103 rejected the recommendation(s), whether the user 103 indicated that he/she liked/disliked the recommendation(s), etc. In such examples, the feedback may be used to further train the one or more neural networks as part of the ongoing user intent extraction element 104.

Figure 2:
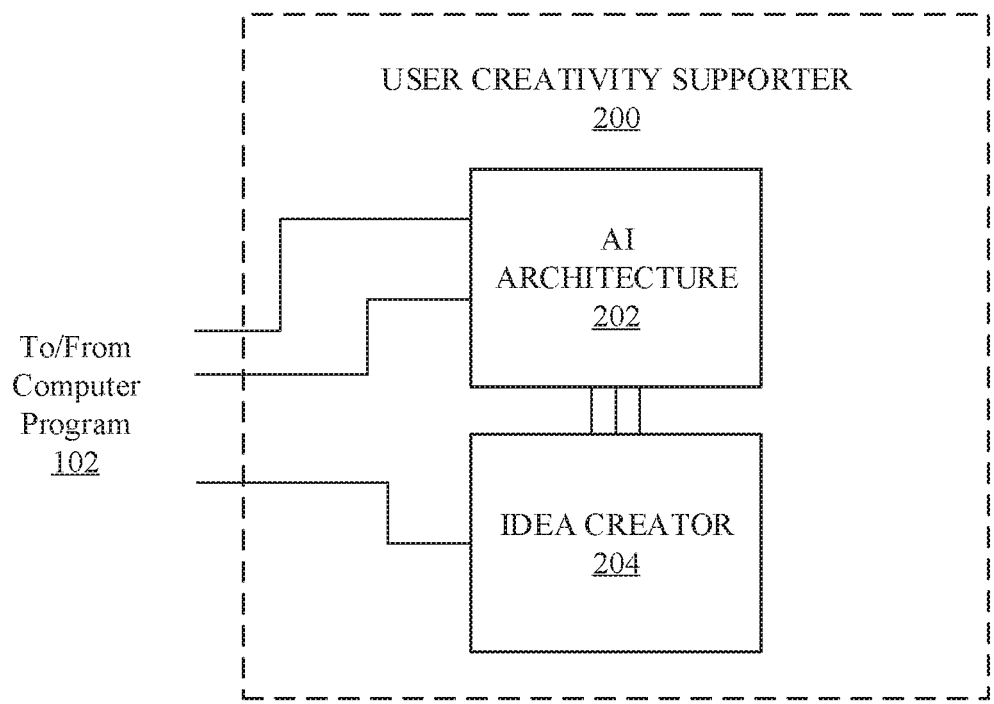
FIG. 2 is a block diagram of an example triggered operations circuitry to implement the machine programmed creative support process of FIG. 1.

FIG. 2 is block diagram of an example user creativity supporter 200 to carry out the functions corresponding to the example user intent extraction element 104, idea generation element 106, and recommendation to user element 108 of FIG. 1. The example user creativity supporter 200 includes an example AI architecture 202 and an example idea creator 204. A portion or all of the example creativity supporter 200 may be implemented on the same computing device as the computer program 102 and/or may be implemented in a remote device (e.g., on the cloud, at a server, using an Internet-based application, etc.).

The example AI architecture 202 of FIG. 2 carries out functions corresponding to the example user intent extraction element 104 of FIG. 1, For example, the AI architecture 202 may include one or more neural networks and/or other AI/ML architecture that are trained to predict user actions based on historical user actions. For example, the AI architecture 202 may predict an action(s) and determine the predicted state of the computer program 102 in response to implementing the predicted action(s) based on the current state of the computer program 102 (e.g., which may include the last user input(s)). After the computer program 102 changes states based on a subsequent user action(s), the AI architecture 202 generates a reward value based on a comparison of the predicted action(s) to the user action and/or the predicted state to the changed state. For example, if the prediction was correct, the reward may be a positive value (e.g., 1) and if the prediction was incorrect the reward may be zero or a negative value (e.g., −1). Additionally, the reward may be based on how correct the prediction was. For example, if the actual action was similar (e.g., mathematically similar) to the predicted action, then the reward can be some number between a completely correct prediction and a completely incorrect prediction (e.g., 0.5). The reward value is used to train the one or more neural networks to generate more accurate subsequent predictions as the user 103 interacts with the computer program 102. Additionally or alternatively, the reward may be based on what actions were taken in response to an action. For example, if a first action is taken and a subsequent action deletes the first action, the first action may receive a negative reward.

The example AI architecture 202 of FIG. 1 may include any number and/or type of neural networks, AI, and/or ML to train itself to predict user actions based on the users historical input data. For example, the AI architecture 202 may include an actor critic architecture, a reinforcement neural network, generative adversarial networks, etc. An example of an actor critic based architecture for the AI architecture 202 is further described below in connection with FIG. 3. Based on a trigger (e.g., a threshold duration of time elapsing without the user 103 input or a command from the user 103), the AI architecture 202 may deploy the one or more trained neural networks to the example idea creator 204 to generate a creative idea based on the user's historical usage of the computer program 102 that is creative to inspire the user 103 to create additional material.

The example idea creator 204 of FIG. 2 uses one or more computer cores to implement the trained neural network(s), AI, and/or ML from the example AI architecture 202 to generate one or more creative idea(s) that is/are based on the user's historical creation patterns. For example, the neural network(s) of the example AI architecture 202 has/have been trained, based on the user's historical input data, to predict the next action that the user 103 may take. Accordingly, the idea creator 204, when receiving the current state of the computer program including the last user input(s), can predict what the next action and resulting state may be for the user 103. However, because identically trained neural networks may output two different outputs based on the same input, the example idea creator 204 applies the current state to the trained neural network(s) multiple times to generate multiple outputs which may or may not be different depending on how the neural network was trained. To conserve time, the idea creator 204 may implement copies of the trained neural network(s) in different computer cores to execute the multiple outputs in parallel. The idea creator 204 applies multiple outputs (e.g., predicted actions) to the current state to generate predicted states. The example idea creator 204 compares the multiple predicted states to the current state to find the X most divergent outputs (e.g., based on a Euclidean distance) from die current state. Because a user who is currently experiencing a block (e.g., "writers block") will likely have already thought about the typical next steps in a creation process (e.g., the least divergent solutions), the idea creator 204 generates a recommendation based on the most divergent solutions representative of the more creative next steps that the trained neural network generated.

In some examples, the process may be repeated two or more times where the X most divergent predicted states are used as inputs to the trained neural network for one or more subsequent iterations, thereby leading to even more creative predicted states that may help muse the user 103 out of the block (e.g., "writers block"). The example idea creator 204 transmit the Y most divergent predicted states (e.g., initially or after any number of iterations) to the computer program 102 to be rendered to the user 103 for selection and/or to inspire the user 103. The X number of more divergent outputs, the number of iterations, and/or the Y number of outputs transmitted to the computer program 102 may be based on user and/or manufacturer preferences. If the user 103 uses none, all, or part of one or more of the idea suggestions, or otherwise indicates all or part of the idea suggestions in a positive or negative manner, the feedback from the user 103 (e.g., based on the next actions of the user 103 and/or the indication from the user 103) may be provided back to the idea creator 204. In this manner, the idea creator 204 can transmit the user feedback to the example AI architecture 202 to use to further train the neural network(s) of the AI architecture 202. The idea creator 204 is further described below in connection with FIG. 4.

Figure 3:
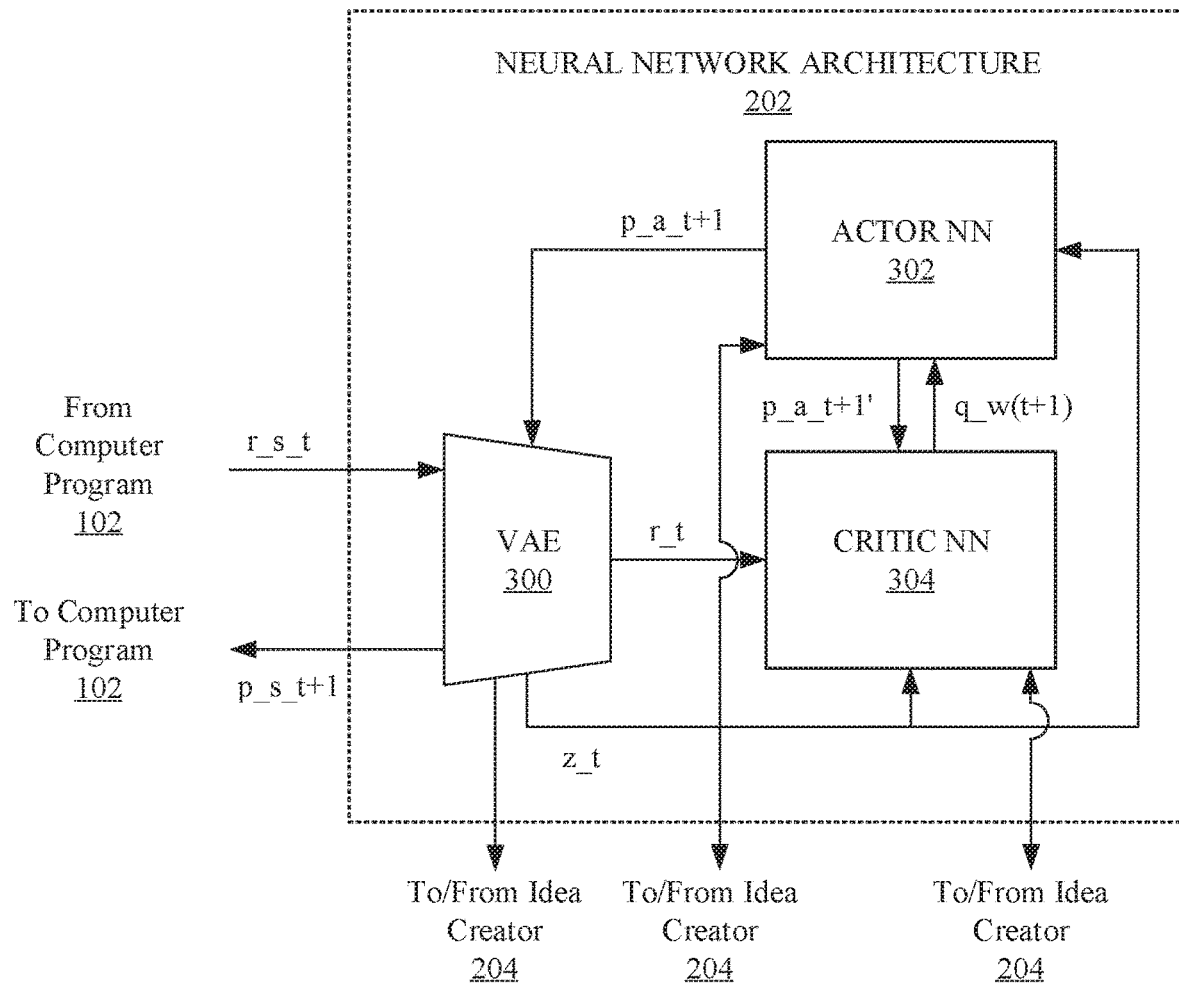
FIG. 3 is a block diagram of the example artificial intelligence architecture of FIG. 2.

FIG. 3 is an example actor critic architecture-based implementation of the example AI architecture 202 of FIG. 2. The example AI architecture 202 includes an example variational autoencoder (VAE) 300, an example actor neural network (NN) 302, and an example critic NN 304. Although the example actor NN 302 and the example critic NN 304 are illustrated as neural networks, the example actor NN 302 and/or critic NN 304 may be implemented with any type of AI/ML architecture (e.g., a machine learning model).

The example VAE 300 of FIG. 3 includes an encoder, a decoder, and a loss function. The encoder of the VAE 300 is a neural network that encodes an input (e.g., an real/actual state of the computer program, r_s_t) into a latent state (e.g., z_t). The received state may be a state vector representative of the state. The latent state is a vector representative of the state of the computer program 102 that includes less data than the state vector. In some examples, the latent state also includes information regarding the last one or more inputs of the user 103, in general, the encoder attempts to reduce the size of the received state to a latent state without losing significant information. The decoder of the VAE 300 is a neural network that can convert a latent state hack to a state of the computer program 102. The loss function of the VAE 300 is a negative log-likelihood with a regularizer to calculate the loss of the encoder when converting the state to the latent state. Accordingly, the VAE 300 converts a received state to a latent state. If the latent state is different than a standard normal distribution, the conversion will receive a penalty in the loss. Accordingly, the loss function trains the encoder and decoder neural networks of the VAE 300 to reduce the state data into smaller latent state data without loss of significant information (e.g., based on user and/or manufacturer preferences). Once the example actor NN 302 predicts a subsequent action for the user 103 (p_a_t+1) based on the latent state of the computer program 102, the example VAE 300 applies the subsequent action to the latent state and then converts the updated latent state to the predicted next state of the computer program 102 (e.g., p_s_t+1). In this manner, the computer program 102 and/or other device can compare the predicted next state of the computer program 102 to the real/actual next state of the computer program (e.g., r_s_t+1) to generate a reward value (e.g., r_t+1). The example computer program 102 and/or other device may generate a reward value at any given time (r_t) based on a comparison of the current state (s_t) to the previously predicted state (s_t−1). The reward is used to train the example critic NN 304, as further described below. In the example of FIG. 3, the reward is transmitted from the computer program 102 and/or other device to the example VAE 300 and the reward is forwarded to the example critic NN 304. Additionally or alternatively, the reward is transmitted from the computer program 102 and/or other device to the example critic NN 304 (e.g., without passing through the example VAE 300).

The example actor NN 302 of FIG. 3 receives the latent state (e.g., latent vector z_t) representative of the current actual/real state of the computer program 102. The example actor NN 302 selects a predicted action based on an actor policy (e.g., corresponding to historical user inputs and/or historical states of the computer program 102). The actor policy ($\pi(z, \alpha, \theta)$) corresponds to the training of the actor NN 302 and is a function of the latent state (z), last taken action (a), and policy updates ($\theta$) based on feedback from the critic NN 304. For example, when the actor NN 302 receives the latent state, the actor NN 302 selects a predicted action based on the actor policy, the actor NN 302 transmits the predicted action (p_a_t+1') to the example critic NN 304. As further described below, the critic NN 304 generates and transmits a value for the selected action (q_w(t+1)). The actor NN 302 updates the actor policy based on the critic value and the latent state. For example the actor NN 302 may update the actor policy using the below Equation 1.

$$\Delta v = \alpha \nabla_\theta (\log \pi_\theta(z_t, a_t)) q_\omega(z_t, a_t) \quad (1)$$

In Equation 1, $\alpha$ is a learning rate for the actor NN 302. Additionally, if the value for the selected action is too low, the example actor NN 302 predicts a new action (p_a_t+1') based on the updated policy and transmits the updated action to the example critic NN 304. The process may continue a few iterations until the action selected by the example actor NN 302 has a value above some threshold. Once the final predicted value is determined, the example actor NN 302 transmits the predicted action (p_a_t+1) to the example VAE 300, so that the VAE 300 can apply the predicted action to the latent state and decode to a predicted state (e.g., p_s_t+1), as described above. When idea generation is triggered, the trained actor NN 302 is deployed to the example idea creator 204 of FIG. 2 (e.g., the characteristics and/or information of the trained actor NN 302 are deployed to the idea creator 204 to be implemented in a computer core). Additionally, the example actor NN 302 may update its actor policy function based on feedback from the user 103 based on one or more ideas generated by the example idea creator 204.

The example critic NN 304 of FIG. 3 receives the latent state (e.g., latent vector z_t) representative of the current actual/real state of the computer program 102. The example critic NN 304 updates the value function based on the latent function using the below Equation 2.

$$\Delta\omega = \beta(R(z_t, a_t) + \gamma q_\omega(z_{t+1}, a_{t+1}) - q_\omega(z_t, a_t))\nabla_\omega q_\omega(z_t, a_t) \quad (2)$$

In Equation 2, $\omega$ is a learning rate for the critic NN 304, $R(z_t, \alpha_t)$ is the reward (r_t) of the previously predicted action, $\gamma$ is a discount factor for future reward predictions, and $\nabla_\omega q_\omega(z_t, \alpha_t)$ is the gradient of the critic value function. Accordingly, when the actor NN 302 transmits a potential predicted action (p_a_t+1') to the critic NN 304, the critic NN 304 updates the value function and applies the potential predicted action to the value function to generate a value for the predicted action. The example critic NN 304 transmits the value to the actor NN 302 to provide feedback to the actor NN 302. When idea generation is triggered, the trained critic NN 304 is deployed to the example idea creator 204 of FIG. 2 (e.g., the characteristics of and/or information related to the trained critic NN 304 are deployed to the idea creator 204 to be implemented in a computer core). Additionally, the example critic NN 304 may update its value function based on feedback from the user 103 based on one or more ideas generated by the example idea creator 204.

Figure 4:
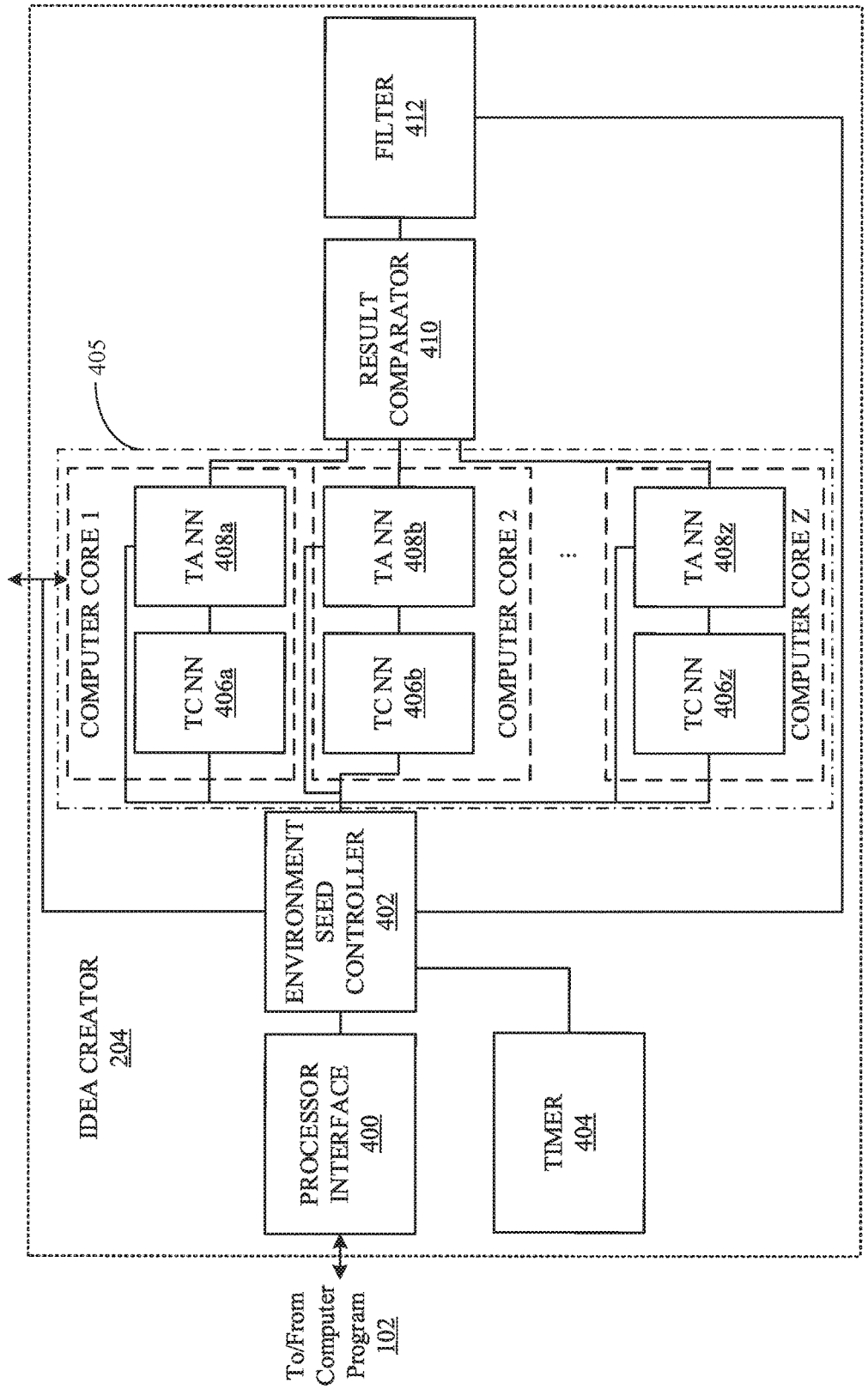
FIG. 4 is a block diagram of the example idea generator of FIG. 2.

FIG. 4 is an implementation of the example idea creator 204 of FIG. 2. The example idea creator 204 includes an example processor interface 400, an example environment seed controller 402, an example timer 404, an example processor 405 including example trained critic neural networks (TC NN) 406a-406z and example trained actor neural networks (TA NN) 408a-408z, an example result comparator 410, and an example filter 412. Although the example idea creator 204 has Z number of computer cores, the idea creator 204 may have any number of computer cores. The example implementation of the example idea creator 204 corresponds to the neural network structure of the example AI architecture 202 of FIG. 3. However, if the example AI architecture 202 is implemented in a different neural network architecture, AI architecture, and/or ML architecture, the example idea creator 204 may be adjusted to correspond to the same type of architecture as the AI architecture 202.

The example processor interface 400 of FIG. 4 interfaces (e.g., via a wired or wireless connection) with the example computer program 102 of FIG. 1 to determine when the user 103 has provided inputs. Additionally, the processor interface 400 provides the user 103 with ideas when the user 103 experiences a block in creativity by transmitting the ideas to the computer program 102 to render to the user 103. The example processor interface 400 may transmit a signal to the environment seed controller 402 whenever the user 103 enters a user input (e.g., based on a signal from the computer program 102) and/or whenever the user 103 requests ideas (e.g., based on a signal from the computer program 102). Additionally, the processor interface 400 may receive the generated creative ideas from the example environment seed controller 402. When an idea generation process is to initiate, the example computer program 102 provides the current state of the computer program 102 to the example environment seed controller 402 via the example computer program 102. The state may include the items currently being rendered (e.g., text, pictures, video, sound, etc.) by the computer program 102 as well as the last user input or last X number of user inputs provided to the computer program 102.

The example environment seed controller 402 of FIG. 4 determines when to initiate a creative idea (e.g., muse) to render to the user 103 and/or controls the number of iterations to generate the creative idea. For example, the environment seed controller 402 may determine when more than a threshold amount of time has passed since the user 103 has entered an input. For example, the environment seed controller 402 may track time using the example timer 404 and when the amount of time since the user 103 has provided an input is above a threshold amount of time, the environment seed controller 402 triggers generation of a creative idea(s). Additionally or alternatively, the example environment seed controller 402 may initiate generation of a creative idea(s) in response to obtaining a user request (e.g., from the computer program 102 via the example processor interface 400) for one or more creative ideas.

Once idea creation is initiated, the example environment seed controller 402 of FIG. 4 instructs the example AI architecture 202 to deploy the trained actor NN 302 and the trained critic NN 304 to the computer cores of the example idea creator 204. Once deployed, the example environment seed controller 402 transmits the state information from the example computer program 102 to the computer cores to generate multiple user-inspired results in parallel. In some examples, the environment seed controller 402 of FIG. 4 may perform multiple iterations where one or more results of an iteration is/are used as inputs for a subsequent iteration. The number of iterations may be based on user/manufacturer preferences and/or based on a comparison of the result to the state of the computer program 102. For example, the environment seed controller 402 may compare the current state to creative idea and if the creative idea is too similar to the current state (e.g., based on a Euclidean distance and/or any other mathematical comparison with a preset threshold), the environment seed controller 402 will perform a subsequent iteration.

The example processor 405 of FIG. 4 includes one or more computer cores that implement one or more copies of the example TC NNs 406a-z and the example TA NNs 408a-z. The example IC NNs 406a-406z and the example TA NNs 408a-408z of FIG. 4 are neural networks implemented in different computer cores that correspond to the trained actor NN 302 and the trained critic NN 304. For example, the characteristics of and/or information corresponding to the trained actor NN 302 are deployed on the example TA NNs 408a-408z so that each of the TA NNs 40a-408z act in the same manner as the actor NN 302 of FIG. 3. Additionally, the characteristics of and/or information corresponding to the trained critic NN 304 are deployed on the example TC NNs 406a-406z so that each of the TC NNs 406a-406z act in the same manner as the critic NN 304 of FIG. 3. In this manner, when the example environment seed controller 402 transmits the current state of the computer program 102 to the example TC NNs 406a-406z and the TA NN 408a-408z in each computer core, the neural networks of the computer cores independently predict a next action in parallel (e.g., based on the user's historical input data). The example TA NNs 408a-408z predict an action and the example TC NNs 406a-406z determine the value of the action until a predicted action is agreed upon (e.g., when the value of a selected action is above a threshold). Although the example TC NNs 406a-406z and the example TA NNs 408a-408z are implemented with the same trained characteristics and/or information and the example TC NNs 406a-406z and the example TA NNs 408a-408z all receive the same input state, the predicted action from the example TA NNs 408a-408z may or may not be different. In some examples, the example processor 405 may include only one computer core with one TC NN and one TA NN. In such an example, the example environment seed controller 402 may input the same state into the single computer core multiple times to the obtain multiple results.

The example result comparator 410 of FIG. 4 performs comparison of the different outputs (e.g., predicted actions) from the TA NNs 408a-408z of the computer cores after being applied to the current state. For example, the result comparator 410 may perform an Euclidean distance between (A) the predicted actions after being applied to the current state and (B) the current state. For example, if vector A corresponds to predicted state after applying a predicted action and vector B corresponds to the current state, then the Euclidean distance can be determined using Equation 3.

$$d(A,B) = \sqrt{(a_1-b_1)^2 + (a_2-b_2)^2 + ... + (a_n-b_n)^2} \quad (3)$$

In Equation 3, $a_1$-$a_n$ are the elements of vector A and $b_1$-$b_n$ are the elements of vector B. Additionally or alternatively, the example result comparator 410 may use different comparison techniques to compare the outputs of the computer cores to the current state. The example result comparator 410 transmits the predicted states and the comparison results to the example filter 412.

The example filter 412 of FIG. 4 filters out (e.g., discards) the X least divergent results (e.g., the results that correspond to the smallest Euclidean distance). As described above, the least divergent results are predicted states that correspond to the most likely actions that the user 103 will take. However, when a user is experiencing a block in creativity, the user most likely has already thought about the most likely actions and is not satisfied with the results of the most likely actions. Accordingly, the example filter 412 filters the results so that only the most creative results remain. Although the results are the most creative, because the results were formed using neural networks that were trained based on the user's historical inputs, they still correspond to the user's mindset. The number of results that are filtered out are based on user and/or manufacturer preferences. The filter 412 provides the remaining predicted states to the example environment seed controller 402.

As described above, the example environment seed controller 402 may perform one or more iterations using results the remaining predicted states after the filtering process. For example, if there are three remaining predicted states, the environment seed controller 402 may use a first third of the computer cores to perform a subsequent iteration based on a first one of the remaining predicted states, use a second third of the computer cores to perform a subsequent iteration based on a second one of the remaining predicted states, and use a third of the computer cores to perform a subsequent iteration based on a third one of the remaining predicted states. In another example, if there are three remaining predicted states, the environment seed controller 402 uses the computer cores to perform a subsequent iteration for the first remaining predicted state, the second remaining predicted state, and the third remaining predicted state separately (in order, for example). In either example, during the iteration, the result comparator 410 may compare the resulting states of the iteration to any one of the input states of the iteration and/or the current state of the computer program 102.

While an example manner of implementing the AI architecture 202 of FIG. 2 is illustrated in FIG. 3 and an example manner of implementing the idea creator 204 of FIG. 2 is illustrated in FIG. 4, one or more of the elements, processes and/or devices illustrated in FIGS. 3 and/or 4 may be combined, divided, re-arranged, omitted, eliminated and/or implemented in any other way. Further, the example VAE 300, the example actor NN 302, and/or the example critic NN 304, and/or, more generally, the example AI architecture 202 of FIG. 3 and/or the example processor interface 400, the example environment seed controller 402, the example timer 404, the example processor 405, the example TC NNs 406a-406z, the example TA NNs 408a-408z, the example result comparator 410, the example filter 412, and/or, more generally the example idea creator 204 of FIG. 4 may be implemented by hardware, software, firmware and/or any combination of hardware, software and/or firmware. Thus, for example, any of the example VAE 300, the example actor NN 302, and/or the example critic NN 304, and/or, more generally, the example AI architecture 202 of FIG. 3 and/or the example processor interface 400, the example environment seed controller 402, the example timer 404, the example processor 405, the example TC NNs 406a-406z, the example TA NNs 408a-408z, the example result comparator 410, the example filter 412, and/or, more generally the example idea creator 204 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example VAE 300, the example actor NN 302, and/or the example critic NN 304, and/or, more generally, the example AI architecture 202 of FIG. 3 and/or the example processor interface 400, the example environment seed controller 402, the example timer 404, the example processor 405, the example TC NNs 406a-406z, the example TA NNs 408a-408z, the example result comparator 410, the example filter 412, and/or, more generally the example idea creator 204 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AI architecture 202 and/or the example idea creator of FIG. 2 may include one or more elements, processes and/or devices in addition to, or instead of, those illustrated in FIGS. 3 and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired)

communication and/or constant communication, but rather additionally includes selective communication at periodic intervals, scheduled intervals, aperiodic intervals, and/or one-time events.

Figure 5:
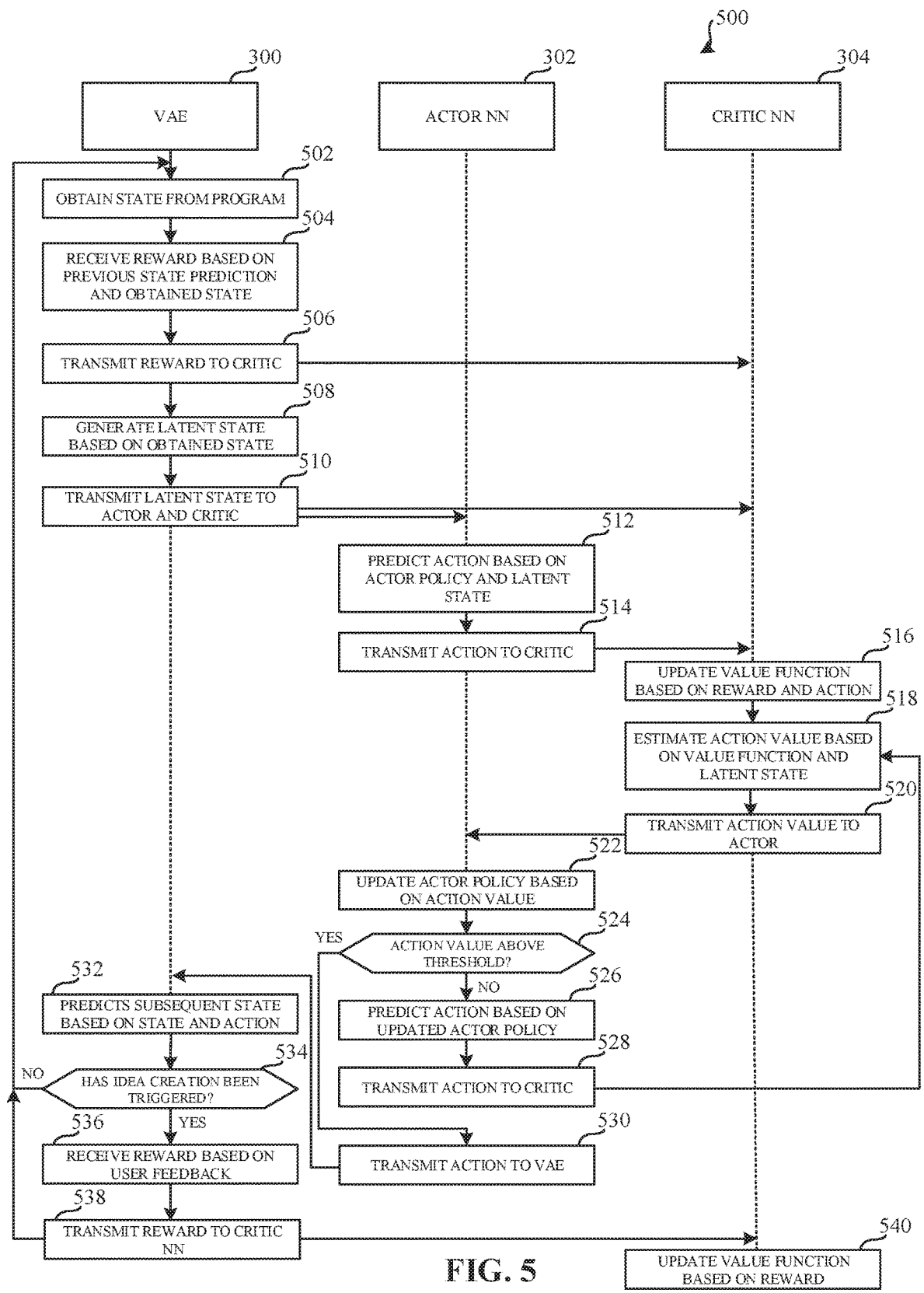
FIG. 5 is a flowchart representative of example machine readable instructions which may be executed to implement the example artificial intelligence architecture of FIGS. 2 and/or 3.
Figure 6:
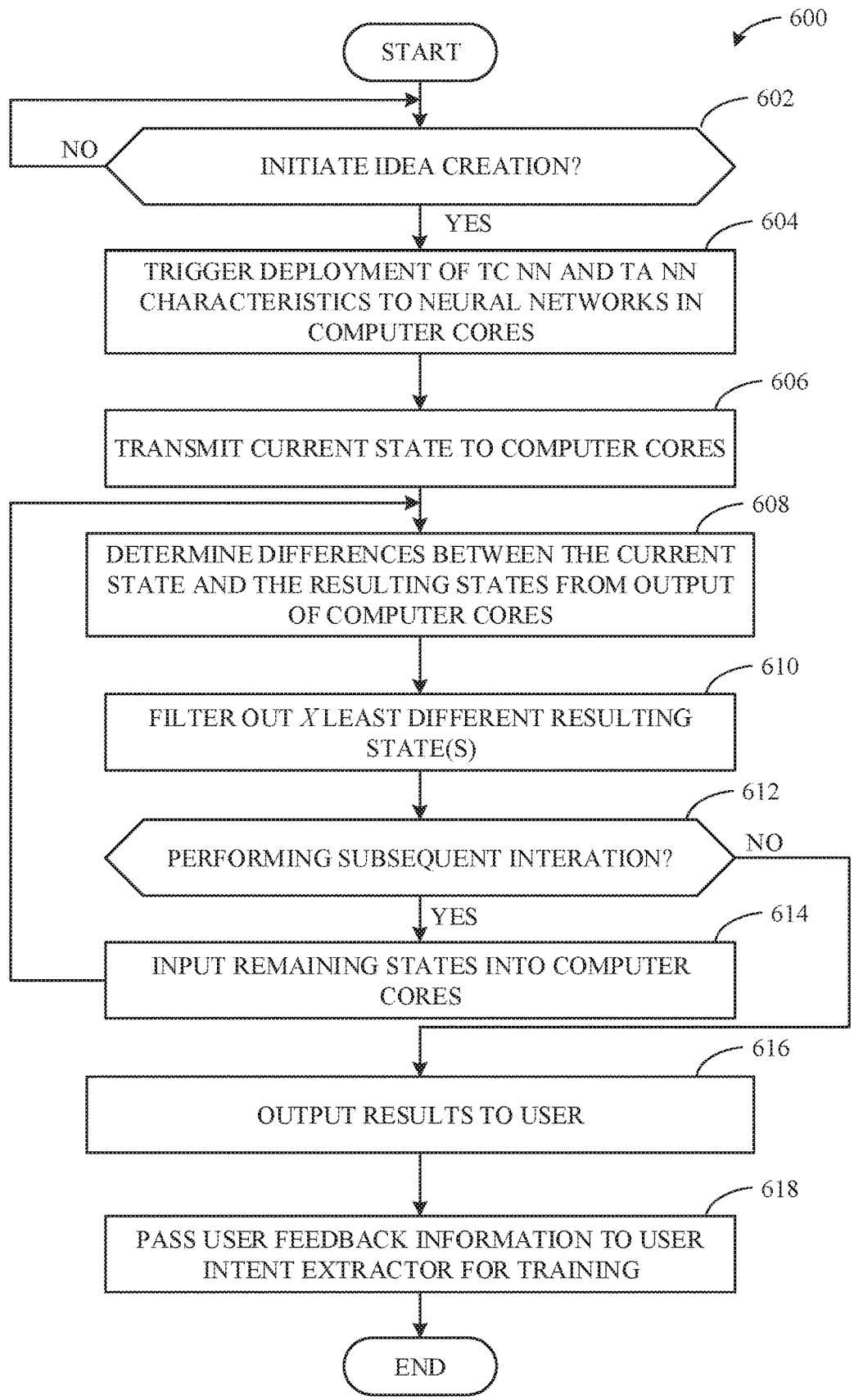
FIG. 6 is a flowchart representative of example machine readable instructions which may be executed to implement the example idea generator of FIGS. 2 and/or 4.

Flowcharts representative of example hardware logic, machine readable instructions, hardware implemented state machines, and/or any combination thereof for implementing the example AI architecture 202 and/or the example idea creator 204 of FIGS. 3 and/or 4 are shown in FIGS. 5-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example AI architecture 202 and/or the example idea creator 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions which may be executed to implement the example AI architecture 202 of FIG. 3 to train the example VAE 300, the example actor NN 302, and the example critic NN 304 to be able to predict user actions in connection with the computer program 102 of FIG. 1.

At block 502, the example VAE 300 obtains a state from the example computer program 102. As described above the state corresponds to the current text, image, sound, video, etc. being rendered by the computer program 102 and the last one or more user inputs. At bock 504, the example VAE 300 receives a reward based on the previous predicted state and the obtained current state. For example, because the example AI architecture 202 creates a predicted state after every user action, the computer device 102 and/or other device can generate a reward for each predicted state after the user 103 has acted to determine how accurate the previous prediction was and transmit the reward to the VAE 300. In some examples, the computer device 102 and/or other device generates the reward for one or more predicted actions based on the user's input. For example, if the user's input is a delete input, the computer device 102 and/or other device may create a negative reward for the action that was deleted.

At block 506, the example VAE 300 transmits the reward to the critic NN 304. In some examples, the computer device 102 and/or other device may transmit the reward to the example critic NN 304 (e.g., without transmitting to the VAE 300). At block 508, the example VAE 300 generates a latent state based on the obtained current state. The latent state is a vector representative of the state of the computer program 102, where the latent state has less data than the state of the computer program 102. As described above in connection with FIG. 3, the VAE 300 gets trained based on the encoding of the state to the latent state to improve the latent state generation. At block 510, the example VAE 300 transmits the latent state corresponding to the state of the computer program 102 to the action NN 302 and the critic NN 304.

At block 512, the example actor NN 302 predicts an action that the user 103 will take based on the actor policy and the latent state. Once the action is predicted, the example actor NN 302 transmits the action to the critic NN 304 (block 514). At block 516, the example critic NN 304 updates the value function based on the reward and the predicted action. For example, the critic NN 304 may update the value function using the above Equation 2. At block 518, the example critic NN 304 estimates an action value based on the value function and the latent state. At block 520, the example critic NN 304 transmits the action value to the actor NN 302.

At block 522, the example actor NN 302 updates the actor policy based on the received action value. For example, the actor NN 302 may use the above Equation 1 to update the actor policy. At block 524, the example actor NN 302 determines if the action value is above a threshold amount (e.g., defined by a user and/or manufacturer). For example, if the action value is high, then the example actor NN 302 determines that the predicted action is a good choice. If the action value is low, then the example actor NN 302 determines that the action is a poor choice and is able to predict a new action based on the update actor policy. If the example actor NN 302 determines that the action value is not above the threshold (block 524: NO), the example actor NN 302 predicts an action based on the updated actor policy (block 526). At block 528, the example actor NN 302 transmits the subsequently predicted action to the example critic NN 304 and control returns to block 518 so that the critic NN 304 can estimate an action value for the subsequently predicted action. If the example actor NN 302 determines that the action value is above the threshold (block 524: YES), the example actor NN 302 transmits the predicted action to the example VAE 300 (block 530).

At block 532, the example VAE 300 predicts a subsequent state by applying the predicted action to the current state. The predicted state represents the what the AI architecture 202 believes will be the next state of the computer program 102 after the user inputs the next action. As described above, the computer device 102 and/or other device will use the actual subsequent state (e.g., the next state of the computer program 102 after the user 103 enters the next input) to generate a reward for the predicted action by comparing the actual subsequent state to the predicted subsequent state.

At block 534, the example VAE 300 determines if idea creation has been triggered. For example, if the example idea creator 204 generates one or more creative ideas to render to the user 103, the example idea creator 204 may transmit the user feedback (e.g., including the action(s) predicted during the idea creation and any pail of the idea that the user 103 used or didn't use, direct feedback provided by the user 103 regarding the ideas, etc.) to the example VAE 300. Accordingly, the example VAE 300 may determine if the idea creation has been triggered when e VAE 300 receives user feedback information from the example idea creator 204.

If the VAE 300 determines that idea creation has not been triggered (block 534: NO), control returns to block 502 to continue to train based on subsequent user inputs. If the VAE 300 determines that idea creation has been triggered (block 534: YES), the example VAE 300 receives a reward (e.g., from the example computer device 102 and/or other device) corresponding to the selected actions of the idea creator 204 based on the user feedback (block 536). At block 538, the example VAE 300 transmits the reward to the critic NN 304. After block 538, control of the VAE 300 returns to block 502. At block 540, the example critic NN 304 updates the value function based on the reward and the action(s) predicted during the idea creation using the above Equation 2.

FIG. 6 is a flowchart representative of example machine readable instructions which may be executed to implement the example idea creator 204 of FIG. 3 to generate a creative muse to inspire the user 103 of the example computer program 102.

At block 602, the example environment seed controller 402 determines if idea creation should be initiated. The example environment seed controller 402 may determine that idea creation should be initiated in response from instruction from the computer program 102 (e.g., via the example processor interface 400) or in response to determining that the user 103 hasn't entered a user input within a threshold amount of time (e.g., as tracked by the example timer 404). If the example environment seed controller 402 determines that idea creation should not be initiated (block 602: NO), control returns to block 602 until the environment seed controller 402 determines that idea creation should be initiated. If the example environment seed controller 402 determines that idea creation should be initiated (block 602: YES), the example environment seed controller 402 triggers deployment of the trained critic neural network (TC NN) characteristics, (e.g., characteristics relating to and/or information corresponding to implementing the trained critic neural network in an untrained neural network) and the trained actor neural network (TA NN) characteristics and/or information to the neural networks 406a-406z, 408a-408z in the computer cores of the example idea creator 204 (block 604). For example, the environment seed controller 402 instructs the example actor NN 302 and the example critic NN 304 of the AI architecture 202 to deploy their trained characteristics and/or information to be implemented in the example TC NNs 406a-406z and the example TA NNs 408a, 408z.

At block 606, the example environment seed controller 402 transmits the current state of the computer program 102 to the TC NNs 406a-408z and the TA NN 408a-408z of the computer cores. The current state includes what the computer program 102 is currently rendering to the user 103 as well as one or more of the previous inputs from the user 103. Once the current states are transmitted to the TC NNs 406a-406z and the TA NNs 408a-408z, the TA NNs 408a-408z and the TC NNs 406a-406z work together (e.g., the first TA NN 408a works with the first TC NN 406a, the second TA NN 408b works with the second TC NN 406b, etc.) to predict a subsequent action based on the current state. For example, the first TA NN 408a selects an action based on the actor policy and transmits the selected action to the TC NN 406a, where the TC NN 406a generates an action value based on the value function. If the value is above a threshold, the TA NN 408a outputs the selected action. Otherwise, the TA NN 408a selects a new action and the process repeats. As described above in connection with FIG. 4, even though each of the TC NNs 406a-406z and the TA NNs 408a-408z are implemented based on the same trained characteristics and/or information, the outputs (e.g., predicted actions) may be different.

At block 608, the example result comparator 410 determines differences between the current state and the resulting states from the outputs of the computer cores (e.g., the predicted actions applied to the current state). For example, the result comparator 410 may determine the first resulting state by applying the action from the first TA NN 408a to the current state. In such an example, the result comparator 410 compares the first resulting state to the current state based on a Euclidean distance, for example. At block 610, the example filter 412 filters out the X lease different resulting state(s) (e.g., discards the resulting states that are the have the smallest distance or are the least divergent from the current state). The X number of resulting states to be filtered out may be based on user and/or manufacturer preferences. The example filter 412 transmits the remaining resulting state(s) to the example environment seed controller 402.

At block 612, the example environment seed controller 402 determines if a subsequent iteration should be performed. For example, the environment seed controller 402 may determine that a subsequent iteration should be performed when the remaining states are less divergent (e.g., based on the determination of the result comparator 410 at block 608) than a minimum threshold. Additionally or alternatively, the example environment seed controller 402 may be configured to perform X number of iterations (e.g., based on user and/or manufacturer preferences). If the example environment seed controller 402 determines that a subsequent iteration should be performed (block 612: YES), the example environment seed controller 402 inputs the remaining states into the computer cores (block 614). For example, if there are three remaining states, the environment seed controller 402 may use a first third of the computer cores to perform a subsequent iteration based on a first one of the remaining states, use a second third of the computer cores to perform a subsequent iteration based on a second one of the remaining states, and use a third of the computer cores to perform a subsequent iteration based on a third one of the remaining states. In another example, if there are three remaining states, the environment seed controller 402 uses the computer cores to perform a subsequent iteration for the first remaining state, the second remaining state, and the third remaining state separately (in order, for example).

If the example environment seed controller 402 determines that a subsequent iteration should not be performed (block 612: NO), the example environment seed controller 402 sends instructions (e.g., via the example processor interface 400) to the example computer program 102 to output the result(s) (e.g., the creative muse(s)) to the user 103. The number of results output to the user 103 may be based on user and/or manufacturer preferences. At block 618, the example environment seed controller 402 passes user feedback information to the AI architecture 202 for training. The user feedback information may include actual feedback from the user 103 (e.g., parts or the entire of result that the user 103 liked, disliked, etc.), parts of the result(s) that were used or not used by the user 103, etc.

Figure 7:
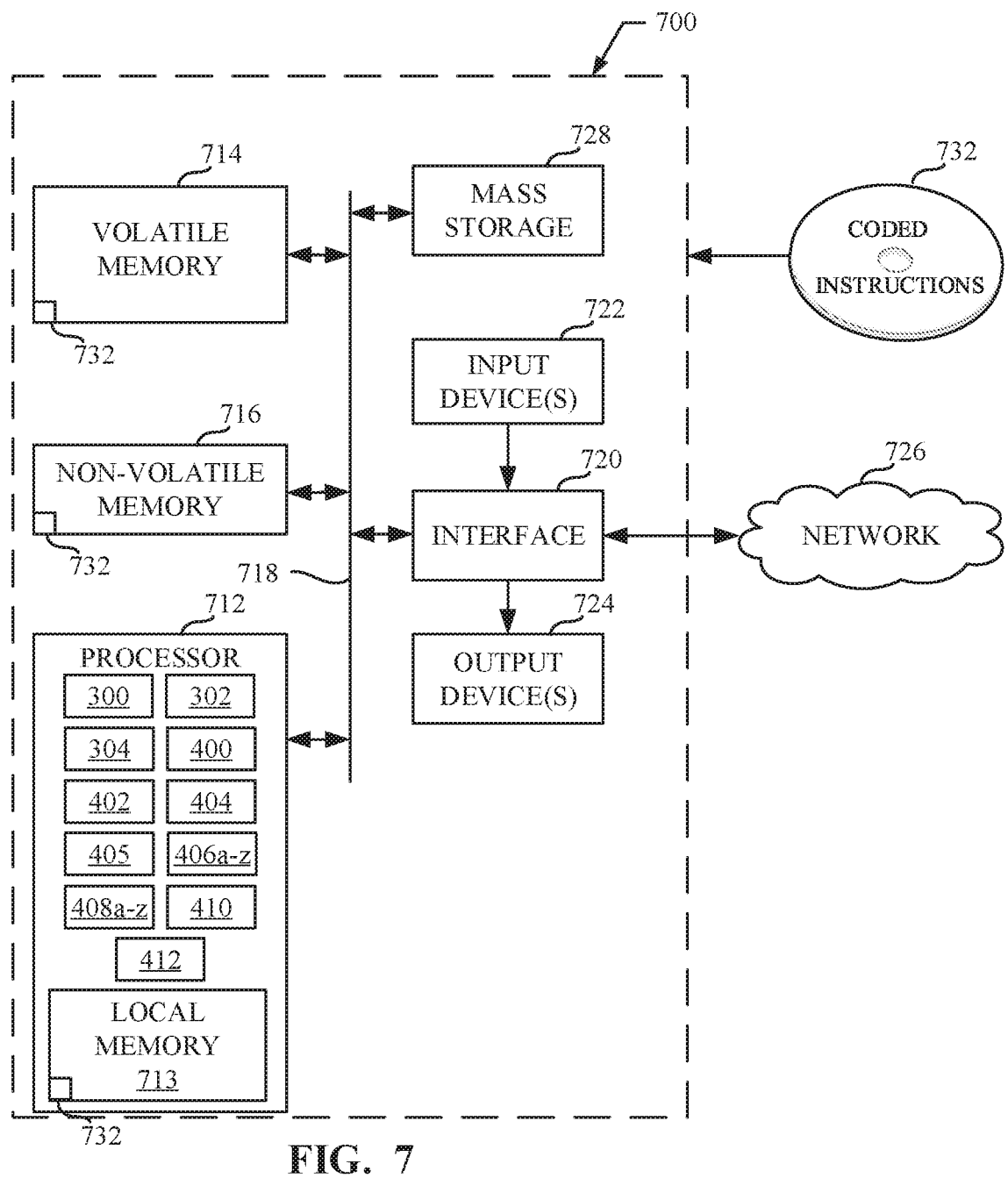
FIG. 7 is a block diagram of an example processing platform structured to execute the instructions of FIG. 5-6 to implement the example triggered operations circuitry of FIG. 2.

FIG. 7 is a block diagram of an example processor platform 1000 structured to execute the instructions of FIGS. 5-6 to implement the example user creativity supporter 200, the example AI architecture 202, and/or the example idea creator 204 of FIGS. 2, 3 and/or 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the components of the example AI architecture 202 and the example idea creator 204 (e.g., the example VAE 300, the example actor NN 302, and/or the example critic NN 304, the example processor interface 400, the example environment seed controller 402, the example timer 404, the example processor 405, the example TC NNs 406a-406z, the example TA NNs 408a-408z, the example result comparator 410, and the example filter 412).

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and/or 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that to provide machine programmed creative support to a user. During training, examples disclosed herein include a VAE to reduce the size of the state vector to a latent vector representative of the state vector. Additionally, examples disclosed herein, during implementation of the trained neural network(s), utilize multiple computer cores in parallel to generate a faster more efficient results. The disclosed methods, apparatus and articles of manufacture improve the efficiency of using a computing device by reducing computing resources during training and increasing time efficiency during implementation of the trained neural networks. The disclosed methods, apparatus and articles of manufacture are accordingly directed to one or more improvement(s) in the functioning of a computer.

Example methods, apparatus, systems, and articles of manufacture to provide machine programmed creative support to a user are disclosed herein. Further examples and combinations thereof include the following: Example 1 includes an apparatus to generate an idea to inspire a user, the apparatus including an artificial intelligence architecture to be trained based on previous inputs of the user, a processor to implement a first neural network based on the trained artificial intelligence architecture, and predict a first action based on a current state of a computer program using the first neural network, implement a second neural network based on the trained artificial intelligence architecture, and predict a second action based on the current state of the computer program using the second neural network, and a controller to select a state based on the action that results in a state that is more divergent from the current state of the computer program.

Example 2 includes the apparatus of example 1 wherein the current state includes at least one of (A) items currently being rendered by the computer program or (B) a last input of the user.

Example 3 includes the apparatus of example 1, wherein the artificial intelligence architecture is trained to predict the next action of the user based on previous inputs of the user with respect to previous states.

Example 4 includes the apparatus of example 1, wherein the state is a first state, the artificial intelligence architecture including a variational autoencoder to convert a second state into a latent state, generate a predicted state based on a predicted action, a third neural network to predict a third action based on the latent state, update based on a value for the third action, and when the value for the third action is above a threshold, select the third action as the predicted action, and a fourth neural network to estimate the value for the third action based on the latent state, and update based on a reward for the previous predicted state based on the second state.

Example 5 includes the apparatus of example 1, further including a comparator to (A) determine a first distance between a first state corresponding to the first action to the current state and (B) determine a second distance between a second state corresponding to the second action to the current state, the more divergent state being the state with the larger distance.

Example 6 includes the apparatus of example 1, wherein the controller is to instruct a user interface to render the selected state to the user.

Example 7 includes the apparatus of example 1, wherein the processor includes a first computer core to implement the first neural network based on the trained artificial intelligence architecture, and predict the first action based on the current state of the computer program using the first neural network, and a second computer core to implement the second neural network based on the trained artificial intelligence architecture, and predict the second action based on the current state of the computer program using the second neural network.

Example 8 includes the apparatus of example 7, wherein the first computer core is to generate a third action based on the selected state using the first neural network, the second computer core is to generate a fourth action based on the selected state using the second neural network, and the controller is to instruct a user interface to render the a subsequently selected state based on the action that is more divergent from the current state of the computer program.

Example 9 includes the apparatus of example 7, wherein the artificial intelligence architecture is to deploy trained artificial intelligence information to the first and second computer core based on instructions from the controller.

Example 10 includes the apparatus of example 9, wherein the controller is to transmit the instructions to the artificial intelligence architecture in response to at least one of a threshold amount of time or a trigger from the computer program.

Example 11 includes the apparatus of example 1, wherein the artificial intelligence architecture is to train based on user feedback corresponding to the selected state.

Example 12 includes a method to generate an idea to inspire a user, the method including training, by executing an instruction with a processor, an artificial intelligence architecture based on previous inputs of the user, implementing a first neural network based on the trained artificial intelligence architecture, predicting, by executing an instruction with the processor, a first action based on a current state of a computer program using the first neural network, implementing a second neural network based on the trained artificial intelligence architecture, predicting, by executing an instruction with the processor, a second action based on the current state of the computer program using the second neural network, and selecting, by executing an instruction with the processor, a state based on the action that results in a state that is more divergent from the current state of the computer program.

Example 13 includes the method of example 12, wherein the current state includes at least one of (A) items currently being rendered by the computer program or (B) a last input of the user.

Example 14 includes the method of example 12, wherein the artificial intelligence architecture is trained to predict the next action of the user based on previous inputs of the user with respect to previous states.

Example 15 includes the method of example 12, wherein the state is a first state, further including converting a second state into a latent state, generating a predicted state based on a predicted action, predicting a third action based on the latent state, updating based on a value for the third action, when the value for the third action is above a threshold, selecting the third action as the predicted action, estimating the value for the third action based on the latent state, and updating based on a reward for the previous predicted state based on the second state.

Example 16 includes the method of example 12, further including determining a first distance between a first state corresponding to the first action to the current state, and determining a second distance between a second state corresponding to the second action to the current state, the more divergent state being the state with the larger distance.

Example 17 includes the method of example 12, further including instructing a user interface to render the selected state to the user.

Example 18 includes the method of example 12, further including generating a third action based on the selected state using the first neural network, generating a fourth action based on the selected state using the second neural network, and instructing a user interface to render the a subsequently selected state based on the action that is more divergent from the current state of the computer program.

Example 19 includes the method of example 12, further including deploying trained artificial intelligence information to a first and second computer core based on instructions for a controller.

Example 20 includes the method of example 19, further including transmitting the instructions to the artificial intelligence architecture in response to at least one of a threshold amount of time or a trigger from the computer program.

Example 21 includes the method of example 12, further including training the artificial intelligence architecture based on user feedback corresponding to the selected state.

Example 22 includes a non-transitory computer readable storage medium comprising instructions which, when executed, cause a machine to at least train an artificial intelligence architecture based on previous inputs of the user, implement a first machine learning model based on the trained artificial intelligence architecture, predict a first action based on a current state of a computer program using the first machine learning model, implement a second machine learning model based on the trained artificial intelligence architecture, predict a second action based on the current state of the computer program using the second machine learning model, and select a state based on the action that results in a state that is more divergent from the current state of the computer program.

Example 23 includes the computer readable storage medium of example 22, wherein the current state includes at least one of (A) items currently being rendered by the computer program or (B) a last input of the user.

Example 24 includes the computer readable storage medium of example 22, wherein the artificial intelligence architecture is trained to predict the next action of the user based on previous inputs of the user with respect to previous states.

Example 25 includes the computer readable storage medium of example 22, wherein the state is a first state, the instructions to cause the machine to convert a second state into a latent state, generate a predicted state based on a predicted action, predict a third action based on the latent state, update based on a value for the third action, when the value for the third action is above a threshold, select the third action as the predicted action, estimate the value for the third action based on the latent state, and update based on a reward for the previous predicted state based on the second state.

Example 26 includes the computer readable storage medium of example 22, wherein the instructions cause the machine to determine a first distance between a first state corresponding to the first action to the current state, and determine a second distance between a second state corresponding to the second action to the current state, the more divergent state being the state with the larger distance.

Example 27 includes the computer readable storage medium of example 22, wherein the instructions cause the machine to instruct a user interface to render the selected state to the user.

Example 28 includes the computer readable storage medium of example 22, wherein the instructions cause the machine to generate a third action based on the selected state using the first machine learning model, generate a fourth action based on the selected state using the second machine learning model, and instruct a user interface to render the a subsequently selected state based on the action that is more divergent from the current state of the computer program.

Example 29 includes the computer readable storage medium of example 22, wherein the instructions cause the machine to deploy trained artificial intelligence information to a first and second computer core based on instructions for a controller.

Example 30 includes the computer readable storage medium of example 29, wherein the instructions cause the machine to transmit the instructions to the artificial intelligence architecture in response to at least one of a threshold amount of time or a trigger from the computer program.

Example 31 includes the computer readable storage medium of example 22, wherein the instructions cause the machine to train the artificial intelligence architecture based on user feedback corresponding to the selected state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an artificial intelligence architecture to be trained based on previous inputs of a user;
   a processor including:
      a first computer core to:
         implement a first neural network based on the trained artificial intelligence architecture; and
         predict a first action based on a current state of a computer program using the first neural network; and
      a second computer core to:
         implement a second neural network based on the trained artificial intelligence architecture; and
         predict a second action based on the current state of the computer program using the second neural network; and
   a controller to select a state based on the action that results in a state that is more divergent from the current state of the computer program.

2. The apparatus of claim 1, wherein the current state includes at least one of (A) items currently being rendered by the computer program or (B) a last input of the user.

3. The apparatus of claim 1, wherein the artificial intelligence architecture is trained to predict the next action of the user based on previous inputs of the user with respect to previous states.

4. The apparatus of claim 1, wherein the state is a first state, the artificial intelligence architecture including:
   a variational autoencoder to:
      convert a second state into a latent state;
      generate a predicted state based on a predicted action;
   a third neural network to:
      predict a third action based on the latent state;
      update based on a value for the third action; and
      when the value for the third action is above a threshold, select the third action as the predicted action; and
   a fourth neural network to:
      estimate the value for the third action based on the latent state; and
      update based on a reward for a previous predicted state based on the second state.

5. The apparatus of claim 1, further including a comparator to (A) determine a first distance between a first state corresponding to the first action to the current state and (B) determine a second distance between a second state corresponding to the second action to the current state, the more divergent state being the state with the larger distance.

6. The apparatus of claim 1, wherein the controller is to instruct a user interface to render the selected state to the user.

7. The apparatus of claim 1, wherein:
   the first computer core is to generate a third action based on the selected state using the first neural network;
   the second computer core is to generate a fourth action based on the selected state using the second neural network; and
   the controller is to instruct a user interface to render a subsequently selected state based on the action that is more divergent from the current state of the computer program.

8. The apparatus of claim 1, wherein the artificial intelligence architecture is to deploy trained artificial intelligence information to the first and second computer core based on instructions from the controller.

9. The apparatus of claim 8, wherein the controller is to transmit the instructions to the artificial intelligence architecture in response to at least one of a threshold amount of time or a trigger from the computer program.

10. The apparatus of claim 1, wherein the artificial intelligence architecture is to train based on user feedback corresponding to the selected state.

11. A method comprising:
   training, by executing an instruction with a processor, an artificial intelligence architecture based on previous inputs of a user;
   implementing, using a first computer core of the processor, a first neural network based on the trained artificial intelligence architecture;
   predicting, using the first computer core of the processor, a first action based on a current state of a computer program using the first neural network;
   implementing, using a second computer core of the processor, a second neural network based on the trained artificial intelligence architecture;
   predicting, using the second computer core of the processor, a second action based on the current state of the computer program using the second neural network; and
   selecting, by executing an instruction with the processor, a state based on the action that results in a state that is more divergent from the current state of the computer program.

12. The method of claim 11, wherein the current state includes at least one of (A) items currently being rendered by the computer program or (B) a last input of the user.

13. The method of claim 11, wherein the artificial intelligence architecture is trained to predict the next action of the user based on previous inputs of the user with respect to previous states.

14. The method of claim 11, wherein the state is a first state, further including:
   converting a second state into a latent state;
   generating a predicted state based on a predicted action;
   predicting a third action based on the latent state;
   updating based on a value for the third action;
   when the value for the third action is above a threshold, selecting the third action as the predicted action;
   estimating the value for the third action based on the latent state; and
   updating based on a reward for a previous predicted state based on the second state.

15. The method of claim 11, further including:
   determining a first distance between a first state corresponding to the first action to the current state; and
   determining a second distance between a second state corresponding to the second action to the current state, the more divergent state being the state with the larger distance.

16. The method of claim 11, further including instructing a user interface to render the selected state to the user.

17. The method of claim 11, further including:
generating a third action based on the selected state using the first neural network;
generating a fourth action based on the selected state using the second neural network; and
instructing a user interface to render a subsequently selected state based on the action that is more divergent from the current state of the computer program.

18. The method of claim 11, further including deploying trained artificial intelligence information to a first and second computer core based on instructions for a controller.

19. The method of claim 18, further including transmitting the instructions to the artificial intelligence architecture in response to at least one of a threshold amount of time or a trigger from the computer program.

20. The method of claim 11, further including training the artificial intelligence architecture based on user feedback corresponding to the selected state.

21. A non-transitory computer readable storage medium comprising instructions which, when executed, cause a machine to at least:
train an artificial intelligence architecture based on previous inputs of a user;
use a first computer core to implement a first machine learning model based on the trained artificial intelligence architecture;
use the first computer core to predict a first action based on a current state of a computer program using the first machine learning model;
use a second computer core to implement a second machine learning model based on the trained artificial intelligence architecture;
use the second computer core to predict a second action based on the current state of the computer program using the second machine learning model; and
select a state based on the action that results in a state that is more divergent from the current state of the computer program.

22. The computer readable storage medium of claim 21, wherein the current state includes at least one of (A) items currently being rendered by the computer program or (B) a last input of the user.

23. The computer readable storage medium of claim 21, wherein the artificial intelligence architecture is trained to predict the next action of the user based on previous inputs of the user with respect to previous states.

24. The computer readable storage medium of claim 21, wherein the state is a first state, the instructions to cause the machine to:
convert a second state into a latent state;
generate a predicted state based on a predicted action;
predict a third action based on the latent state;
update based on a value for the third action;
when the value for the third action is above a threshold, select the third action as the predicted action;
estimate the value for the third action based on the latent state; and
update based on a reward for a previous predicted state based on the second state.

* * * * *